US005928686A

United States Patent [19]
Ivey et al.

[11] Patent Number: 5,928,686
[45] Date of Patent: Jul. 27, 1999

[54] NUTRIENT FORMULATION AND PROCESS FOR FEEDING YOUNG POULTRY AND OTHER ANIMALS

[75] Inventors: Francis J. Ivey, Creve Couer; Julia J. Dibner, Chesterfield; Christopher D. Knight, St. Louis, all of Mo.

[73] Assignee: Novus International, Inc., St. Louis, Mo.

[21] Appl. No.: 08/483,297

[22] Filed: Jun. 7, 1995

[51] Int. Cl.⁶ .................................. A23K 1/00; A23K 1/18
[52] U.S. Cl. .................................. 426/2; 426/60; 426/573; 426/575; 426/623; 426/807; 424/442
[58] Field of Search .................................. 426/2, 807, 60, 426/573, 575, 623; 424/442

[56] References Cited

U.S. PATENT DOCUMENTS

| | | | |
|---|---|---|---|
| 1,867,063 | 7/1932 | Dawe . | |
| 2,593,577 | 4/1952 | Lewis | 99/4 |
| 2,620,274 | 12/1952 | Lewis et al. . | |
| 2,946,722 | 7/1960 | Hoffman et al. . | |
| 3,635,723 | 1/1972 | Shelton et al. | 99/2 R |
| 4,089,979 | 5/1978 | Jackson | 426/69 |
| 4,143,171 | 3/1979 | Buckley et al. | 426/331 |
| 4,158,706 | 6/1979 | Ernst et al. | 426/327 |
| 4,495,208 | 1/1985 | Friedman et al. | 426/335 |
| 4,910,024 | 3/1990 | Pratt | 426/2 |
| 4,988,531 | 1/1991 | Moore et al. | 426/578 |
| 5,089,277 | 2/1992 | Prochnow | 426/1 |
| 5,139,792 | 8/1992 | Ware et al. | 426/2 |
| 5,217,740 | 6/1993 | Lanter | 426/573 |
| 5,387,522 | 2/1995 | Vasington et al. | 435/287 |
| 5,603,980 | 2/1997 | Bussiere et al. | 426/641 |

FOREIGN PATENT DOCUMENTS

| | | |
|---|---|---|
| 0287699A3 | 10/1988 | European Pat. Off. . |
| 749695A1 | 12/1996 | European Pat. Off. . |
| 2031748 | 4/1980 | United Kingdom . |
| 2055034 | 2/1981 | United Kingdom . |
| WO 93/00017 | 1/1993 | WIPO . |
| WO 95/16461 | 6/1995 | WIPO . |

OTHER PUBLICATIONS

Tadtiyanant, C., Lyons, J.J., Vandepopuliere, J.M., "Influence of Wet and Dry Feed on Laying Hens under Heat Stress", Poultry Science, vol. 70, No. 1, (1991) pp. 44–52.

Thorne, D.H., Vandepopuliere, J.M. and Lyons, J.J., "Automated High Moisture Diet Feeding System for Laying Hens," Poultry Science vol. 68, No. 8, (1989), Pp. 1114–1117.

Baranyoiva "Influencing of Deutectomy, Food Intake And Fasting On The Digestive Tract Dimensions In Chickens After Hatching" Acta Vet. Brno, vol. 41 (1972) pp. 373–384.

Baranyoiva et al. "Morphological Changes In The Intestinal Wall In The Fed and Fasted Chickens In The First Week After Hatching", Acta Vet. Brno, vol. 45 (1976) pp. 151–158.

Moran Jr., "Subcutaneous Glucose Is More Than Oral Administration" Poultry Science, vol. 67 (1988) pp. 493–501.

Kienholz et al. "Oral Food Slurry Injection For Newly Hatched Poults" Poultry Science, vol. 49 (1970) pp. 678–680.

Moran Jr., "Effects of Posthatch Glucose on Poults Fed and Fasted During Yolk Sac Depletion" Poultry Science, vol. 68 (1989) pp. 1141–1147.

Pinchasov et al. "A Single Post–Hatch Intubation of Various Nutrients Improves Subsequent Early Performance of Young Birds" Proceedings: XIX World's Poultry Congress, vol. 3 (1992) pp. 614–618.

Twining, Jr. et al. "Feed and Water Management of the Broiler Chick for the First 72 Hours" Poultry Science, vol. 57 (1978) pp. 1325–1328.

Thaxton et al. "Growth, Efficiency, and Livability of Newly Hatched Broilers as Influenced by Hydration and Intake of Sucrose" Poultry Science, vol. 55 (1976) pp. 2275–2279.

Waldroup et al. "The Effectiveness of Nutrient Solutions Given to Young Turkey Poults in Drinking Water or by Oral and Parenteral Dosage" Poultry Science, vol. 53 (1974) pp. 1056–1060.

Buddington et al. "Ontogenetic Development of Intestinal Nutrient Transporters" Annu. Rev. Physiol., vol. 51 (1989) pp. 601–619.

Casteel et al. "The Influence of Extended Posthatch Holding Time and Placement Density on Broiler Performance" vol. 73, (1994) pp. 1679–1684.

Chamblee et al. "Yolk Sac Absorption and Initiation of Growth in Broilers" Poultry Science, vol. 71 (1992) pp. 1811–1816.

Engku Azahan et al. "Growth, Food Intake and Energy Balance of Layer and Broiler Chickens Offered Glucose in the Drinking Water and the Effect of Dietary Protein Content" British Poultry Science, vol. 30 (1989) pp. 907–917.

Entenamn et al. "The Lipid Content of Blood, Liver, and Yolk Sac of the Newly Hatched Chick and the Changes That Occur in These Tissues During the First Month of Life" J. Biol. Chem. vol. 133 (1940) pp. 231–241.

Fanguy et al. "Effect of Delayed Placement on Mortality and Growth Performance of Commercial Broilers" Poultry Science, vol. 59 (1980) pp. 1215–1220.

Fedde et al. "Factors Affecting the Absorbability of Certain Dietary Fats in the Chick" J. Nutrition, vol. 70 (1960) pp. 447–452.

Gomez et al. "The Use of Bile Salts to Improve Absorption of Tallow in Chicks, One to Three Weeks of Age" Poultry Science vol. 55 (1976) pp. 2189–2195.

(List continued on next page.)

*Primary Examiner*—Helen Pratt
*Attorney, Agent, or Firm*—Senniger, Powers, Leavitt & Roedel

[57] ABSTRACT

A nutrient formulation including moisture which is designed for use in very young poultry, and a method of feeding it which improves subsequent livability, cumulative feed efficiency and weight gain is disclosed. The method includes feeding a high moisture solid containing at least about 20% by weight water to the poultry before the poultry is allowed to eat dry food ad libitum.

64 Claims, No Drawings

OTHER PUBLICATIONS

Hager et al. "Posthatch Incubation Time and Early Growth of Broiler Chickens" Poultry Science, vol. 62 (1983) pp. 247–254.

Kingston, D. "Some Hatchery Factors Involved in Early Chick Mortality" Australian Veterinary Journal, vol. 55 (Sep. 1979) pp. 418–421.

Knoblock et al. "Ingestive Behavior of Day–Old Chicks" Poultry Science, vol. 49 (1970) pp. 598–599.

Krogdahl et al. "Influence of Age on Lipase, Amylase, and Protease Activities in Pancreatic Tissue and Intestinal Contents of Young Turkeys" Poultry Science, vol. 68, pp. 1561–1568.

Moran, E. "Effects of egg Weight, Glucose Administration at Hatch, and Delayed Access to Feed and Water on the Poult at 2 Weeks of Age" Poultry Science, No. 69 (1990) pp. 1718–1723.

Moreto et al. "Transport of L–proline and α–methyl–D–glucoside by chicken Proximal Cecum During Development" Am. J. Physiol. vol. 260 (1991) pp. G457–G463.

Nitsan et al. "Organ Growth and Digestive Enzyme Levels to Fifteen Days of Age in Lines of Chickens Differing in Body Weight" Poultry Science, vol. 70 (1991) pp. 2040–2048.

Nitsan et al. "Growth and Development of the Digestive Organs and Some Enzymes in Broiler Chickens After Hatching" British Poultry Science, vol. 32 (1991) pp. 515–523.

Noy et al. "Digestion and Absorption in the Young Chick" Poultry Science, vol. 74 (1995) pp. 366–373.

Novle et al. "Lipid changes in the Residual Yolk and Liver of Chick Immediately After Hatching" Biol Neonate, vol. 56 (1989) pp. 228–236.

Phelps et al. "Research Note: Effect of Prefeeding on Physio–logical Parameters Associated with Turkey Poult Mortality" Poultry Science, vol. 66 (1987) pp. 1882–1884.

Phelps et al. "The Posthatch Physiology of the Turkey Poult–III. Yolk Depletion and Serum Metabolites" Comp. Biochem. Physiol., vol. 87A, No. 2 (1987) pp. 409–415.

Pinchasov et al. "Comparison of Post–Hatch Holding Time and Subsequent Early Performance of Broiler Chicks and Turkey Poults" British Poultry Science, vol. 34 (1993) pp. 111–120.

Polin et al. "The Effect of Bile Acids and Lipase on Absorption of Tallow in Young Chicks" Poultry Science, vol. 59 (1980) pp. 2738–2743.

Sell et al. "Influence on Age on Utilization of Supplemental Fats by Young Turkeys" Poultry Science, vol. 56 (1986) pp. 546–554.

Sell et al. "Intestinal Disaccharidases of Young Turkeys: Temporal Development and Influence of Diet Consumption" Poultry Science, vol. 68 (1989) pp. 265–277.

Sell et al. "Developmental Patterns of Selected Characteristics of the Gastrointestinal Tract of Young Turkeys" Poultry Science, vol. 70 (1991) pp. 1200–1205.

Shehata et al. "Development of brush–border Membrane Hexose Transport System in Chick Jejunum" Am. J. Physiol. vol. 240 (1981) pp. G102–G108.

Vanheel et al. "Resoption of Yolk Lipids by the Pigeon Embryo" Comp. Biochem. Physiol., vol. 68A (1981) pp. 641–46.

Warriss et al. "Responses of Newly Hatched Chicks to Inanition" Veterniarty Record, vol. 130 (1991) pp. 49–53.

Wyatt et al. "Influence of Hatcher Holding Times on Several Physiological Parameters Associated With the Immune System of Chickens" Poultry Science, vol. 65 (1986) pp. 2156–2164.

Wyatt et al. "Influence of Egg Size, Eggshell Quality, and Posthatch Holding Time on Broiler Performance" Poultry Science, vol. 64 (1985) pp. 2049–2055.

"Cocci Control By Vaccine", From a talk by Dr. Eng Hong Lee at the 1991 Saskatchewan Poultry Industry Conference, Canada Poultryman, Sep. 1991, p. 39.

Gary Thornton "A Novel Cocci Vaccine System", Broiler Industry, May 1997, pp. 36, 38, 40.

NUTRIENT FORMULATION AND PROCESS FOR FEEDING YOUNG POULTRY AND OTHER ANIMALS

BACKGROUND OF THE INVENTION

The present invention is directed to a high moisture solid for providing nutrients, drugs, vitamins, minerals, bile salts, surfactants, probiotics, enzymes, peptides, hormones, prostaglandins, antioxidants, living cells, and immunoactive agents to poultry, and more particularly, a high moisture solid and process which may be used to improve the health and enhance the livability, cumulative weight gain and feed conversion efficiency of poultry and other animals.

For economic reasons, the management of chick hatching in commercial facilities places high importance on percent chicks hatched of eggs set. To achieve hatch rates of 90%, early-hatching birds are often left in the hatch incubator for a period of time to allow the later-hatching chicks to emerge and dry. By the time the chicks are removed from the incubator tray, therefore, they will range in age from several hours up to about 2 days in age (as measured from hatching for each bird). This period is referred to as the post-hatch holding period.

After the chicks are removed from the incubator trays in a commercial hatchery, they are processed (inoculated and sexed) and then placed in boxes commonly referred to as chick boxes for shipping to the production farm. The processing period typically requires several hours and the chicks may reside in the chick boxes for several more hours before transit to the production farm actually begins.

Commercial hatcheries for poultry typically provide chicks for a number of production farms, often over a wide geographical area. Feed and water are not provided until the birds reach the production farm and, as a result, the birds may go several days before feed and water are provided. The presence of the lipid-rich residual yolk sac and reserves of lipid in the liver, however, ensure that the minimal nutritional needs of hatchling birds are met (Freeman et al., *Development of the Avian Embryo*, London, Chapman and Hall, 1974). Thus, a period of inanition after hatching is normal in birds and does not necessarily threaten their survival (Entenman et al., The Lipid Content of Blood, Liver, and Yolk Sac of the Newly Hatched Chick and the Changes That Occur in These Tissues During the First Month of Life, J. Biol Chem., Vol. 133, pp. 231–241 (1940); Vanheel et al., Resorption of Yolk Lipids by the Pigeon Embryo, Comp. Biochem. Physiol., Vol. 68A pp. 641–646 (1981); Phelps et al., The Posthatch Physiology of the Turkey Poult-III. Yolk Depletion and Serum Metabolites, Comp. Biochem. Physiol., Vol. 87A, No. 2 pp. 409–415 (1987); Noble et al., Lipid Changes in the Residual Yolk and Liver of the Chick Immediately after Hatching, Biol Neonate, Vol. 56, pp. 228–236 (1989); Chamblee et al, Yolk Sac Absorption and Initiation of Growth in Broilers, Poultry Science, Vol. 72, pp. 1811–1816 (1992)). This does not mean, however, that using yolk residue as the single nutrient source in hatchlings will provide optimum subsequent livability, disease resistance, or gain and feed efficiency. The delayed placement has been shown to reduce subsequent livability (Kingston, Some Hatchery Factors Involved in Early Chick Mortality, Australian Veterinary Jour., Vol. 55, pp. 418–421 (1979); Fanguy et al., Effect of Delayed Placement on Mortality and Growth Performance of Commercial Broilers, Poultry Science, Vol. 59, pp. 1215–1220 (1980)), disease resistance (Wyatt et al., Influence of Hatcher Holding Times on Several Physiological Parameters Associated With the Immune System of Chickens, Poultry Science, Vol. 65, pp. 2156–2164 (1986); Casteel et ale, The Influence of Extended Posthatch Holding Time and Placement Density on Broiler Performance, Poultry Science, Vol. 73, pp. 1679–1684 (1994)) and growth performance (Hager et al., Education and Production Posthatch Incubation Time and Early Growth of Broiler Chickens, Poultry Science, Vol. 62, pp. 247–254 (1983); Wyatt et al., Influence of Egg Size, Eggshell Quality, and Posthatch Holding Time on Broiler Performance, Poultry Science, Vol. 64, pp. 2049–2055 (1985); Pinchasov et al., Comparison of Post-Hatch Holding Time and Subsequent Early Performance of Broiler Chicks and Turkey Poults, British Poultry Science, Vol. 34, pp. 111–120 (1993)). Provision of individual nutrients such as glucose has not been found to consistently or permanently improve performance or livability when administered as a simple solution in the absence of other nutrients (Azahan et al., Growth, Food Intake and Energy Balance of Layer and Broiler Chickens Offered Glucose in the Drinking Water and the Effect of Dietary Protein Content, British Poultry Science, Vol. 30, pp. 907–917 (1989); Moran, Effects of Posthatch Glucose on Poults Fed and Fasted During Yolk Sac Depletion, Poultry Science, Vol. 68, pp. 1141–1147 (1989); Moran Effects of Egg Weight, Glucose Administration at Hatch, and Delayed Access to Feed and Water on the Poult at 2 Weeks of Age, Poultry Science, Vol. 69, pp. 1718–1723 (1990)).

Although provision of water and feed can result in performance superior to that of fasted, water-deprived birds, it is not feasible to include water in the hatch incubator or in transport boxes. This is because humidity control and relatively high temperature are critical in ensuring high hatchability and because presence of water in transport boxes would result in some chicks getting wet. Chicks cannot regulate their body temperature sufficiently well to tolerate evaporation. Since inanition does not threaten survival, commercial practice is not to offer feed or water until the animals reach the farm.

SUMMARY OF THE INVENTION

Among the objects of the invention, therefore, may be noted the provision of a formulation to improve the health and enhance the livability, cumulative weight gain and feed conversion efficiency of poultry and other animals. The formulation may be fed, for example, immediately after hatching of the animal and for this application, the formulation preferably excludes nutrients which are not used well during the first days of life and provides those which are readily used and confer a performance advantage. Also among the objects of the invention is a formulation which contains an amount of water designed to provide adequate moisture during this period. The formulation may contain a source of fatty acids, amino acids, carbohydrate or other ingredients to provide other advantages.

Briefly, therefore, the present invention is directed to a process for enhancing the health, livability, cumulative weight gain or feed conversion efficiency of poultry. The process comprises feeding the hatchlings a high moisture solid before they are started on a diet comprising dry food. The hatchlings are fed the high moisture solid beginning at a point in time preferably within the first 5 days of hatching, more preferably within the first 3 days of hatching, and most preferably as soon as possible after hatching.

The present invention is also directed to a composition and process for inoculating poultry and other animals with living cells such as yeast or bacteria. The animal is fed a high moisture solid which contains a number of colony forming units of the cells which is sufficient to inoculate the animal and produce the desired effect.

The present invention is further directed to a high moisture solid for improving the health, livability, cumulative weight gain or feed conversion efficiency of poultry. The high moisture solid may comprise, for example, between about 50% and about 95% by weight water, between about 5% and about 50% by weight dry matter, and an additive selected from the group consisting of bile salts, surfactants, enzymes, enzyme co-factors, hormones, prostaglandins, peptides, immunoglobulins, cytokines, antioxidants, amino acids and sources of amino acids and amino acid analogs, antibiotics, vitamins and minerals. The dry matter preferably comprises about 10% to about 90% by weight carbohydrate.

Other objects and features of the invention will be in part apparent and in part pointed out hereinafter.

DETAILED DESCRIPTION OF THE INVENTION

Surprisingly, it has been discovered that the growth of poultry can be stimulated, the livability, cumulative weight gain and feed conversion efficiency of the poultry can be improved by feeding to poultry and other animals a high moisture solid of the present invention. In addition, various substances can be administered by including the substance in the high moisture solid.

In one embodiment of the present invention, the high moisture solid is first fed to hatchlings which are within five, four, three, two or even one day of hatching (as determined for each bird). Preferably, the high moisture solid is fed to the hatchlings before they are fed dry food or allowed to drink water ad libitum, and more preferably before they are fed solid food, at all. The high moisture solid may be placed, for example, in the hatching incubator along with the eggs from which the poultry will hatch so that the high moisture solid is available to the hatchlings immediately upon hatching. Providing the high moisture solid to the chicks prior to their introduction to solid food reduces the likelihood that the hatchlings will suffer by consuming dry food without simultaneously drinking.

In another embodiment of the present invention, the high moisture solid may be made available to the hatchlings prior to or during shipping by placing the high moisture solid in the chick boxes along with the chicks. In accordance with this embodiment, it is preferred that the high moisture solid be placed in the chick boxes before transit begins so that the chicks will have the opportunity to consume the high moisture solid before they begin travelling (that is, moving by surface or air transportation from the site of the incubator to a remote location such as a poultry production farm which may be, for example, one or more miles away from the location of the incubator). The amount of high moisture solid placed in the chick boxes need not be sufficient to enable the chicks to feed on it for the entire transit period.

In a further embodiment of the present invention, the high moisture solid is fed to the poultry after they are shipped from the site where they are hatched to a remote location such as a poultry production farm or other intermediate facility. After being shipped, some chicks do not readily begin eating dry food and drinking water when it is offered. For such applications, it may be desirable to feed the transported poultry the high moisture solid until the poultry begin eating dry food and drinking water ad libitum. In addition, the high moisture solid may also be fed to the poultry at this time or even a later time to administer drugs or other substances as described herein.

The high moisture solid contains at least about 20% by weight (an amount which is in excess of the amount of water contained in "dry" poultry feeds), preferably at least about 25% by weight, still more preferably at least about 30% by weight, still more preferably between about 50% and about 95% by weight, and most preferably between about 65% and about 75% by weight water, based upon the weight of the high moisture solid. The high moisture solid additionally contains at least about 5%, preferably at least about 10%, more preferably about 15% to about 50%, and most preferably between about 25% and about 35% by weight dry matter, based upon the weight of the high moisture solid. The non-aqueous fraction of the high moisture solid is referred to herein as the "dry matter" or the "solid matter" fraction, with the two terms being used interchangeably. The dry matter fraction of the high moisture solid preferably contains carbohydrate and optionally contains other constituents which increase the nutritional value of the high moisture solid or otherwise improve the health of the poultry or other animals.

Carbohydrates provide a source of nutrition for the animals and, in addition, can aid in the formation of the solid. In general, therefore, carbohydrates constitute at least about 5%, preferably between about 10% and about 90%, more preferably between about 50% and about 70%, and most preferably about 60% by weight of the dry matter. The carbohydrates contemplated herein include isolated carbohydrates such as corn starch, potato starch, wheat starch, rice starch, cellulose, pectin, agarose, and gums; bioavailable sugars such as glucose, fructose, and sucrose; chemically modified starches such as modified corn starch, methylcellulose, carboxymethylcellulose, and dextrin; and ground complex carbohydrates such as corn, rice, oats, barley, wheat, sorghum, rye, millet, cassava, triticale and tapioca, in whole, ground, cracked, milled, rolled, extruded, pelleted, defatted, dehydrated, solvent extracted or other processed form. Gums which may be used herein are generally high molecular weight molecules of plant or animal origin, usually with colloidal properties, which in appropriate solvents are able to produce gels, such as agar, algin and carrageenan derived from seaweeds, plant exudates such as gum arabic, ghatti and tragacanth, plant extracts such as pectin, plant seeds such as guar, locust bean, and animal exudates such as plasma, serum albumin, egg albumin, chitin and gelatin. Other gums include amylose and amylopectin and gums of bacterial origin.

The high moisture solid may be formed by mixing the ingredients and heating the mixture. In one embodiment, the mixture contains starch and is heated until the starch granules rupture and the mixture becomes viscous. See, for example, Lewis U.S. Pat. No. 2,593,577. In another embodiment, a gum is dissolved in water at a temperature in excess of about 180° C. to form a colloidal solution which forms a high moisture solid upon cooling. See, for example, U.S. Pat. No. 5,217,740. In yet another embodiment, a gelatinizing aid such as carboxymethylcellulose, lignin, or a lignin derivative is dissolved in water to form a colloidal solution which forms a high moisture solid upon cooling.

To increase the nutritional value of the high moisture solid, the dry matter may contain up to about 70%, preferably between about 15% and about 50% by weight amino acids, precursors or analogues of amino acids, or proteins. Exemplary amino acids are essential amino acids such as methionine, tryptophan, threonine, arginine and lysine. Exemplary amino acid precursors are 2-hydroxy-4-(methylthio)butanoic acid sold, example under the trademark Alimet® by Novus International (St. Louis, Mo.), and salts of 2-hydroxy-4-(methylthio)butanoic acid such as the calcium and sodium salts. Exemplary proteins include single cell proteins or hydrolysates of proteins such as those from yeast, algae or bacteria; isolated animal proteins, peptides or hydrolysates of proteins such as hemoglobin, myosin, plasma, or other serum proteins, collagen, casein, albumin or keratin; complex protein sources or hydrolysates of proteins such as milk, blood, whey, blood meal, meatmeal, feathermeal, fishmeal, meat and bone meal, poultry offal, poultry by-product meal, hatchery by-products, egg offal, egg white, egg yolk, and eggs without shells; plant protein or hydrolysate of proteins such as soybean meal, isolated soybean protein, wheat protein, wheat germ, distillers grains and gluten.

Fat may also be included in the high moisture solid to increase its nutritional value. The dry matter may, for example, contain up to about 15%, preferably between about 0% and about 10% by weight fat, and more preferably between about 2% and about 5% by weight fat. Suitable fats include fatty acids such as linoleic acid; isolated plant oils such as sunflower, safflower, soybean, peanut, canola, corn, rapeseed, olive, linseed and palmkernal; fat meals such as cottonseed, peanut, rapeseed, palmmeal and nut meals; and fats of animal origin such as lard, butter, poultry fat, tallow and fishoil.

To enable hatchlings to more effectively utilize any fats which may be present in the high moisture solid or to enable the hatchlings to more effectively utilize its yolk-based lipid and protein, the high moisture solid may contain bile salts, cholesterol, surfactants, emulsifying agents, micelles, or an enzyme such as lipase, amylase, maltase, pepsin, trypsin, or other enzyme which commonly occur in the gastrointestinal system, or an enzyme such as keratinase which is not typically found in the gastrointestinal system but which has useful activities. The concentration of the digestion aid will depend upon the application but, in general, will be between about 0.01% and about 5% by weight of the dry matter.

The high moisture solid may additionally contain vitamins and minerals. Vitamin additives may be selected, for example, from vitamin A, B12, biotin, choline, folacin, niacin, pantothenic acid, pyridoxine, riboflavin, thiamin, C, D, 25-hydroxy D, E, and K. Mineral additives may be selected, for example, from calcium, phosphorous, selenium, chlorine, magnesium, potassium, sodium, copper, iodine, iron, manganese and chromium pincolinate. The concentration of the vitamins and minerals will depend upon the application but, in general, will be between about 0.01% and about 5% by weight of the dry matter.

Bacterial, yeast or mold preparations, commonly referred to as probiotics or direct fed microbials, have been administered orally or added to animal feeds to provide various benefits such as altering the gastrointestinal microflora/microbiota of poultry and other animals. Those microbial additives which have been approved for use are identified in the annual Feed Additive Compendium published by The Miller Publishing Company (Minnetonka, Minn.) in cooperation with The Animal Health Institute and the Direct-fed Microbial, Enzyme and Forage Additive Compendium published by The Miller Publishing Company. Among the direct-fed microbials which have been approved are strains of the lactic acid bacteria, particularly those classified in the following genera: Lactobacillus, Lactococcus, and Enterococcus. Included among these are the following species: *Lactobacillus reuteri, Lactobacillus acidophilus, Lactobacillus bulgaricus, Lactobacillus plantarum, Lactobacillus casei, Lactobacillus lactis, Lactococcus lactis, Lactococcus thermophilus, Lactococcus diacetylactis*, and *Enterococcus faecium*. In addition to these lactic acid bacteria, some species of Bacillus (such as *Bacillus subtilis* and *Bacillus toyoi*), some species of Streptococcus (such as *Streptococcus faecium*), and yeasts and molds (such as *Saccharomyces cerevisiae, Aspergillus oryzae*, and Torulopsis sp.) have also been used as direct fed microbials.

The high moisture solid of the present invention, therefore, may be used as a vehicle to administer direct-fed microbials to poultry and other animals. When used for this purpose, the high moisture solid should contain sufficient colony forming units of the yeast or bacterium to be of benefit to the animal. In general, the high moisture solid used as a direct fed microbial should contain at least about $10^2$, preferably about $10^4$, and more preferably about $10^6$ colony forming units of bacteria or at least about 10, preferably about $10^2$, and more preferably about $10^4$ colony forming units of yeast per gram of composition. The yeast or bacterium may be incorporated into the high moisture solid prior to solidification or it may be deposited on or in the high moisture solid after it has solidified. Although the high moisture solid may be fed at anytime to alter the gastrointestinal microflora/microbiota of or provide other benefits to the animal, it is preferably fed to poultry as soon as possible after hatching to establish the direct fed microorganism as the dominant microorganism in the gastrointestinal tract and thereby exclude potential pathogens.

The high moisture solid may additionally be used as a vehicle to deliver a variety of other substances to poultry and other animals. For example, the high moisture solid may contain a peptide such as epidermal growth factor, transforming growth factor, granulocyte-macrophage colony stimulating factor, erythropoietin, bombesin, fibroblast growth factor, keratinocyte growth factor, nerve growth factor, vascular endothelial growth factor, bovine or other somatotropin or insulin-like growth factor (IGF-I or IGF-II). The high moisture solid may also contain a steroid or polypeptide hormone such as, estrogen, glucocorticoids, insulin, glucagon, gastrin, calcitonin or somatotropin. The high moisture solid may further contain an antibiotic approved for use in animal feed such as bacitracin, BMD (bacitracin methylenedisalicylate), lincomycin, or virginiamycin or other therapeutic drug. The high moisture solid may also additionally contain a natural or synthetic antioxidant such as ethoxyquin, tocopherol, BHT (butylated hydroxytoluene), BHA (butylated hydroxyanisole), vitamin C or glutathione; a receptor, transfer factor, chelator or complexing agent which modifies release rates of nutrients or other bioactive compounds; an immunoactive agent such as immunoglobulins, cytokines, antigens, killed cells, attenuated strains, toxins, adjuvants or vaccines; or a palatability modifier such as food coloring, grit, oyster shell, whole seeds or grains. The concentration of these additives will depend upon the application but, in general, will be between about 0.1% and about 10% by weight of the dry matter.

In a preferred embodiment, the high moisture solid contains about 65–75% by weight water with the nutrients being protein (35%), carbohydrate (60%) and fat (5%), based upon the weight of the solid matter fraction of the high moisture solid. High moisture solids having this nutrient profile may be prepared, for example, from the following ingredients mix (based upon the weight of the solids):

| | |
|---|---|
| soybean meal | 58% |
| egg white | 8% |
| corn starch | 4% |
| corn meal | 30% |
| Alimet ® | 0.5% |
| propionic acid | 0.5% |
| citric acid | to pH 4.5–5 |

High moisture solids containing these ingredients (and optionally one or more of the above-identified additives) can be made by dry mixing the ingredients, adding hot water (80° C.) and quickly mixing the wetted ingredients while maintaining the temperature above the starch gelation temperature for at least one minute. The mixture is then stirred and pressed into a dish, cylinder or other mold.

Alternatively, the high moisture solid may be prepared from a poultry starter diet formulation. These formulations specify minima for protein, energy, vitamins and other nutrients. The simplest high moisture solid formulation of the present invention thus consists of about 30 parts by weight starter feed and about 70 parts by weight water, heated to the gelation temperature of corn starch. Starter feeds typically contain about 3200 Kcal/kg with the nutrient profile being about 20–25 wt. % protein, about 5–8 wt. % fat, about 3–5 wt. % vitamins and minerals, and a balance of carbohydrate. Furthermore, it is believed that such a formulation can be improved upon through selective replacement of ingredients less available to the hatchling with ingredients of higher digestibility at this age, such as hydrolyzed proteins. Alternatively, the digestibility of ingredients could be improved with additions to the formulation such as, but not limited to, enzymes, bile salts or surfactants. Similarly, overall performance may be improved with the addition of selected micro ingredients, minerals, microorganisms, growth promotants, hormones, prostaglandins such as $E_2$ or other factors which promote enhanced digestive enzyme activity, nutrient absorption or maturation of the gastrointestinal system as a whole.

In general, highly available protein sources might include hydrolyzed poultry protein, hydrolyzed casein, or peptone. In contrast, less available protein sources such as by-product meals or vegetable proteins might be fed in combination with factors such as proteases or microorganisms that secrete proteases to increase digestibility. Similarly, carbohydrates such as glucose may be chosen for high availability, or more complex sources such as ground corn or potato starch may be supplemented with enzymes or subjected to gelation to increase their availability. Digestibility of saturated fats could be improved through the addition of lipase, bile salts or surfactants. Thus, the formulation would include either highly available ingredients or additives or handling methods which improve their digestion in very young birds. The ingredients would be administered in a high moisture semi-solid or solid form.

In addition, it has been demonstrated that the gastrointestinal system of young birds is not able to use certain ingredients such as tallow with the same efficiency as mature birds (Fredde et al., Factors Affecting the Absorbability of Certain Dietary Fats in the Chick, J. Nutrition, Vol. 70, pp. 447–452 (1960); Gomez et al., The Use of Bile Salts to Improve Absorption of Tallow in Chicks, One to Three Weeks of Age, Poultry Science Vol. 55, pp. 2189–2195 (1976); Polin et al., The Effect of Bile Acids and Lipase on Absorption of Tallow in Young Chicks, Poultry Science, Vol. 59, pp. 2738–2743 (1980); Sell et al., Influence of Age on Utilization of Supplemental Fats by Young Turkeys, Poultry Science, Vol. 65, pp. 546–554 (1986)). Ontogenetic changes which accompany improved digestion include increased levels of pancreatic and intestinal enzymes (Krogdahl et al., Influence of Age on Lipase, Amylase, and Protease Activities in Pancreatic Tissue and Intestinal Contents of Young Turkeys, Poultry Science, Vol. 68, pp. 1561–1568 (1989); Sell et al., Intestinal Disaccharidases of Young Turkeys: Temporal Development and Influence of Diet Composition, Poultry Science, Vol. 68, pp. 265–277 (1989); Noy et al., Digestion and Absorption in the Young Chick, Poultry Science, Vol. 74, pp. 366–373 (1995)), overall gut surface area for absorption (Nitsan et al., Growth and Development of the Digestive Organs and Some Enzymes in Broiler Chicks After Hatching, British Poultry Science, Vol. 32, pp. 515–523 (1991); Nitsan et al., Organ Growth and Digestive Enzyme Levels to Fifteen Days of Age in Lines of Chickens Differing in Body Weight, Poultry Science, Vol. 70, pp. 2040–2048 (1991); Sell et al., Developmental Patterns of Selected Characteristics of the Gastrointestinal Tract of Young Turkeys, Poultry Science, Vol. 70, pp. 1200–1205 (1991)), and changes in nutrient transporters (Shehata et al., Development of Brush-Border Membrane Hexose Transport System in Chick Jejunum, Am. J. Physiol, Vol. 240, pp. G102–G108 (1981); Buddington et al., Ontogenetic Development of Intestinal Nutrient Transporters, Annu. Rev. Physiol., Vol. 51, pp. 601–619 (1989); Moreto et al., Transport of L-Proline and α-Methyl-D-Glucoside by Chicken Proximal Cecum During Development, Am. J. Physiol, Vol. 260, pp. G457–G463 (1991)). The high moisture solid of the present invention would minimize or exclude poorly used ingredients and substitute more highly available ingredients as assessed by subsequent bird performance.

The composition of the high moisture solid may also be tailored to meet environmental conditions. Hatchers and brooders are typically warm, relatively low humidity environments. Under these conditions, high moisture solids containing simple starch, protein and water can rather quickly become leather-like or very hard upon dehydration, thus making it difficult for the hatchlings to consume the solid. Materials such as finely ground corn, modified corn starches, and carboxymethylcellulose tend to improve water retention and long-term texture (24–48 hr.), but may result in the formulation sticking to the bird. For this environment, therefore, the high moisture solid preferably comprises about 30–40% by weight dry matter with the dry matter comprising coarser grain and protein meals and a coagulated protein such as egg white.

In contrast, when birds are packed into chick transit boxes used by commercial hatcheries at the usual commercial density (24 birds per quarter) air flow is very low. In addition, hatchlings lose significant amounts of water, particularly during the first 24 hours after hatching. This combination of higher humidity, lower air flow and greater population density can result in mortality if the birds are wetted by the high moisture solid. For this environment, therefore, the high moisture solid comprises about 30 to 40% by weight dry matter with the dry matter comprising a gum or modified corn starch.

The quantity of the high moisture solid fed will be a function of the animal species, age, environmental conditions such as temperature and humidity and, in the case of poultry, the length of the preplacement period, i.e, the total time consumed in the post-hatch holding period, the processing period and in transit to the poultry production farm. In general, however, at least about 10 grams of high moisture solid per chick per day should be provided to 0 to 2 day old chicks, about 20 grams of high moisture solid per chick per day should be provided to 2 to 3 day old chicks, and up to about 50 grams of high moisture solid per chick per day should be provided to 4 to 7 day old chicks.

As previously noted, chicks conventionally are placed with poultry production farms within about 2 days of hatching. This practice has developed, in part, out of the fact that hatchers typically do not provide food or water to the hatchlings and the fact that the hatchlings must receive water and a source of nutrition by about 3 days or else they suffer. Because the composition of the high moisture solids of the present invention can be controlled to meet the changing nutritional requirements of the hatchlings as they mature, it may become practical for hatchers to delay sending chicks to poultry production farms for a longer period of time without experiencing many of the difficulties associated with providing water and nutrition to the chicks. Thus, for example, hatchers could conveniently feed the high moisture composition of the present invention to the chicks for a period of about 3 to about 7 days from hatching before shipping them on to the poultry production farms. Alternatively, the chicks could be shipped from the hatcher to an intermediate facility where they could be fed the high moisture solid for a period of about 7 days and then shipped to the standard poultry production farm. Either approach would allow the poultry production farms to more efficiently utilize their houses without burdening the hatchers with feeding the hatchlings water and dry food.

The following examples will illustrate the invention.

EXAMPLE 1

The performance of 1 to 4 day old birds, i.e., birds which were no less than 1 day old and no more than 4 days old at the start of the test as measured from hatching for each bird, fed high moisture solids consisting of agar (1.5% agar and 98.5% by weight water) or agar and egg yolk (1.5% agar, 10% egg yolk and 88.5% by weight water) were compared to fasted and water deprived birds. The results are presented in Table 1. Birds initially lost weight on all feeding regimes and agar alone gave no benefit in either cumulative gain or cumulative feed-to-gain ratio ("FTG"). Agar plus yolk showed an effect on cumulative gain on days 6 and 13, but cumulative feed-to-gain ratio (sometimes referred to herein as cumulative feed efficiency) was poorer than for fasted birds. The data also suggest that hydration alone (agar treatment) with or without yolk conferred no cumulative feed efficiency benefit in this study. Cumulative livability was improved by feeding either water-containing formulation.

From Table 2 it appears that the high moisture solid containing 25% dry matter gave the best cumulative gain after feeding either 24 or 48 hr. It should be noted, however, that all high moisture solids showed cumulative gain superior to the fasted controls. When cumulative feed efficiency, was corrected for differences in body weight (BW FTG), the 25% dry matter high moisture solid again was superior to the others whether fed for 24 or 48 hr. Cumulative feed intake subsequent to the 48 hr treatment period was higher when birds were given high moisture solids than when they were fasted. This was the case for formulations containing 25, 50 or 100% dry matter. Cumulative livability data suggest that the high moisture solids containing a greater percentage of dry matter are associated with lower livability than the fasted control or 25% dry matter formulations.

TABLE 2

Growth of Birds Fed Starter Feed and Moisture Combinations

| Treatment | Cumul. Gain Day 13 | Cumul. FTG Day 13 | BW Cumul. FTG Day 13 | Cumul. intake Day 13 | Cumulative Livability Day 13 |
|---|---|---|---|---|---|
| Fasted 24 h | 280.9 g | 1.316 | 1.292 | 369.8 g | 100% |
| Formulation 24 h Dry Matter 25% | 303.5 g | 1.319 | 1.285 | 400.3 g | 100% |
| Formation 24 h Dry Matter 50% | 269.0 g | 1.342 | 1.323 | 360.8 g | 100% |
| Formation 24 h Dry Matter 100% | 286.7 g | 1.312 | 1.285 | 375.8 g | 94% |
| Fasted 48 h | 222.8 g | 1.371 | 1.372 | 304.6 g | 96% |
| Formation 48 h Dry Matter 25% | 284.6 g | 1.274 | 1.248 | 362.5 g | 100% |
| Formation 48 h Dry Matter 50% | 267.0 g | 1.353 | 1.335 | 360.4 g | 83% |
| Formation 48 h Dry Matter 100% | 237.9 g | 1.394 | 1.389 | 328.4 g | 83% |

EXAMPLE 3

In this example, groups of one to four day old birds were given 20 g each of a high moisture solid consisting of gelatin and Alimet® (2-hydroxy-4-(methylthio)butanoic acid) base with additions of either corn starch or corn starch and lysine. The dry matter content of the high moisture solid was about 5% and the amount of each of the dry matter constituents, based upon the weight of the high moisture solid for each formulation, was as indicated in Table 3. The formulation containing corn starch, gelatin and Alimet® showed cumu-

TABLE 1

Growth of Birds Fed Nothing or Formulations Consisting of Agar (1.5%) with and without Egg Yolk (10%)

| Trt | Cumul. Gain Day 3 | Cumul. Gain Day 6 | Cumul. FTG Day 6 | Cumul. Gain Day 13 | Cumul. FTG Day 13 | Cumulative Feed Intake Day 13 | Cumulative Livability Day 13 |
|---|---|---|---|---|---|---|---|
| Fasted 24 h | −8.0 | 35.8 g | 1.66 | 1.95.5 g | 1.40 | 274 g | 94% |
| Agar | −7.2 | 32.8 g | 1.95 | 193.7 g | 1.41 | 273 g | 100% |
| Agar & Yolk | −7.8 | 37.5 g | 1.70 | 197.4 g | 1.43 | 282 g | 100% |

EXAMPLE 2

In this example, groups of one to four day old birds were fed for 24 or 48 hours a high moisture solid consisting of starter feed and water. Pens were given enough high moisture solid for each bird to consume 10 g. The feed was present at either 25, 50 or 100% of the high moisture solid.

lative gain and livability superior to the fasted control and the other two formulations. Treatments 2 and 3 also showed superior cumulative feed intake when compared with the fasted control, but the formulations tended to liquify at the brooding temperature would could cause problems in brooding and transit boxes.

TABLE 3

Growth of Birds Fed Formulations Containing Starch, Gelatin, Alimet and Lysine Combinations

| Trt | Corn Starch | Gelatin | Alimet ® | Lysine | Cumul Gain Day 14 | Cumul FTG Day 14 | Cumul Intake Day 14 | Cumulative Livability Day 14 |
|---|---|---|---|---|---|---|---|---|
| Fasted 24 hr | | | | | 297.8 g | 1.22 | 358 g | 95% |
| 1 | 0 g | 2.5% | .13% | 0 | 290.8 g | 1.32 | 340 g | 80% |
| 2 | 2.5% | 2.5% | .13% | 0 | 317.7 g | 1.23 | 392 g | 100% |
| 3 | 2.5% | 2.5% | .13% | .13% | 289.1 g | 1.34 | 360 g | 80% |

EXAMPLE 4

Groups of one to four day old birds were fed formulations containing sources of fats and protein administered with and without added lipase to assist in the digestion of the fat. All formulations contained corn starch, Alimet, lysine and the bile salt, chenodeoxycholic acid. In one case, protein and fat were provided together in the form of yolk solids. In the second case, poultry protein and soy oil were used to provide the protein and fat. The dry matter content of the high moisture solid was about 25% and the amount of each of the dry matter constituents, based upon the weight of the high moisture solid for each formulation, was as indicated in Table 4. Table 4 indicates that the improved cumulative gains and cumulative feed efficiencies were observed in all formulation treatments. Lipase did not appear to be enhance the availability of these complex fat sources. Superior early cumulative feed intake was achieved with yolk solids in the absence of additional lipase. It should be noted that yolk was also used in Example 1, but bird response was not evident in the absence of a source of carbohydrates, bile salts, a methionine source and added lysine.

gain appeared to increase in the presence of water and the DFM. The DFM, therefore, provided some benefit on its own and to optimize this effect more nutrients should be added to the high moisture solid.

TABLE 5

Growth of Birds Fed Agar (1.5%) and Agar Containing a Direct Fed Microbial Consisting of *Lactobacillus acidophilus* and *lactis*, and *Bacillus subtilis* and *licheniformis* (10%)

| Treatment | Cumulative Gain Day 21 | Cumulative Feed to Gain Day 21 | Cumulative Feed Intake Day 21 | Cumulative Livability Day 21 |
|---|---|---|---|---|
| Fasted 24 h | 710.3 g | 1.388 | 985.8 g | 98% |
| Agar (1.5%) | 720.5 g | 1.386 | 998.0 g | 98% |
| Agar (1.5%) DFM (10%) | 724.2 g | 1.387 | 1004.4 g | 98% |

EXAMPLE 6

This example shows the response of one to four day old hatchlings to casein, enzyme hydrolyzed casein and casein

TABLE 4

Growth of Birds Fed Formulations Containing Sources of Protein and Fat, with and without Lipase
(Corn starch: 2.5%, Alimet: .05%, Lysine .05%, Chenodeoxycholic acid: .02%)

| Trt | Addition | Fat | Protein | Cumul. Gain Day 12 | FTG Day 12 | Cumul. intake Day 12 | Cumulative Livability Day 12 |
|---|---|---|---|---|---|---|---|
| Fasted | | | | 253.6 g | 1.30 | 329.2 g | 100% |
| 1 | Egg Yolk (11%) | 7.7% | 3.3% | 284.4 g | 1.22 | 345.6 g | 100% |
| 3 | Lipase (2%) Egg Yolk (11%) | 7.7% | 3.3% | 254.0 g | 1.24 | 312.2 g | 100% |
| 3 | Soy Oil (10%) Poultry Protein (10%) | 10% | 7.5% | 264.3 g | 1.25 | 331.2 g | 95% |
| 4 | Lipase (2%) Soy Oil (10%) Poultry Protein (10%) | 10% | 7.5% | 257.9% | 1.26 | 312.4 g | 100% |

EXAMPLE 5

Groups of one to four day old birds fed agar (1.5% agar and 98.5% water) and agar plus a direct fed microbial (1.5% agar, 88.5% water, 10% Biomate direct fed microbial including the microbial carrier) were compared to a fasted control. The direct fed microbial ("DFM") consisted of two species of Lactobacilli and two species of Bacilli. The direct fed microbial contained $2.2 \times 10^8$ colony forming units per gram of material for each of the Lactobacilli species and $5.5 \times 10^8$ colony forming units per gram of material for each of the Bacilli species with each pen of 8 birds receiving 1 gram of product. Although the cumulative feed efficiency of this treatment was poorer than that of agar alone, cumulative administered with a source of proteolytic activity. The high moisture solid contained 85% water with a balance of constituents as indicated in Table 6. In treatment 3, 0.6% pepsin (based upon the weight of the high moisture solid) was added to the formulation and in treatment 4, a microbe which secretes a proteolytic enzyme was added. All formulation treatments showed superior cumulative gain, cumulative feed efficiency and livability when compared to the fasted control.

TABLE 6

Growth of Birds Fed Formulations with Casein, Hydrolyzed Casein, Casein
with Pepsin or Casein with *B. licheniformis* ($2 \times 10^6$/bird)
(Ground corn: 10%, Agar: .25%, Alimet: .125%, Lysine: .04)

| Trt | Casein | Cumulative Gain Day 12 | Cumulative Feed to Gain Day 12 | Cumulative Feed Intake Day 12 | Cumulative Livability Day 12 |
|---|---|---|---|---|---|
| Fasted 24 h | | 207.2 g | 1.34 | 303.4 g | 79% |
| 1 | Casein (10%) | 249.3 g | 1.21 | 301.7 g | 92% |
| 2 | Hydrolyzed Casein (10%) | 234.8 g | 1.19 | 280.1 g | 96% |
| 3 | Casein (10%) Pepsin (.6%) | 234.8 g | 1.26 | 293.7 g | 91% |
| 4 | Casein (10%) B. licheniformis | 248.8 g | 1.19 | 296.0 g | 91% |

EXAMPLE 7

In this example, zero to two day old birds were fed formulations consisting of 10% dry matter in the form of corn starch (2.5%), protein (5%), and glucose (2.5%), based upon the weight of the high moisture solid. Birds were treated for 24, 48 or 72 hours, to test the possibility of treating birds over the total preplacement period of approximately 2 days in the hatching incubator and 1 day in transit. All formulation treated birds showed cumulative gain superior to birds fasted for an equivalent period. In addition, the birds treated with formulation for 24 and 48 hours also showed superior cumulative feed efficiencies. The response appeared to decline at the 72 hour time point. It appears from these data that 10% dry matter is sufficient to improve performance of young birds over a 2 day period, but that a higher concentration of nutrients may be required by the third day. It should be noted that for each time period, livability of formulation fed birds was superior to fasted controls.

TABLE 7

Growth of Birds Fed Hatchery Formulations Consisting of
Corn Starch (2.5%), Porcine Plasma (5%), Agar (.5%), Alimet
(.125%), Lysine (.125%), Glucose 2.5%; Total 10% Dry Matter

| Treatment | Cumulative Gain Day 16 | Cumulative Feed to Gain Day 16 | Cumulative Feed Intake Day 16 | Cumulative Livability Day 16 |
|---|---|---|---|---|
| Fasted 24 h | 405.4 g | 1.431 | 580.1 g | 93% |
| Formulation 24 h | 435.6 g | 1.422 | 619.4 g | 96% |
| Fasted 48 h | 369.3 g | 1.425 | 526.3 q | 95% |
| Formulation 48 h | 391.7 g | 1.413 | 553.5 g | 100% |
| Fasted 72 h | 331.1 g | 1.430 | 473.5 g | 91% |
| Formulation 72 h | 348.6 g | 1.456 | 507.6 g | 93% |

In view of the above, it will be seen that the several objects of the invention are achieved.

As various changes could be made in the above compositions and processes without departing from the scope of the invention, it is intended that all matter contained in the above description be interpreted as illustrative and not in a limiting sense.

What is claimed is:

1. A process for enhancing the health, livability, cumulative weight gain, or feed conversion efficiency of poultry, the process comprising making available for consumption ad libitum a high moisture solid to the poultry before the poultry is allowed to eat dry food ad libitum, the high moisture solid containing between about 30% and about 90% by weight water and between about 10% and about 70% dry matter based upon the weight of the high moisture solid, wherein the dry matter contains at least about 10% by weight carbohydrate and between about 15% and about 50% by weight of an amino acid source based on the weight of the dry matter.

2. The process of claim 1 wherein the high moisture solid contains between about 50% and about 85% by weight water and between about 15% and about 50% by weight dry matter, and the poultry comprises hatchlings which are within 3 days after hatching.

3. The process of claim 1 wherein the poultry is placed in a container for shipment to a poultry farm and the high moisture solid is made available to the poultry for consumption ad libitum prior to placing the poultry in the container.

4. The process of claim 1 wherein the high moisture solid is made available to the poultry by placing the high moisture solid in an incubator along with the eggs from which the poultry will hatch, thereby making the high moisture solid available to the poultry upon hatching.

5. The process of claim 1 wherein the high moisture solid contains at least about 50% by weight water.

6. The process of claim 1 wherein the high moisture solid lacks the complete nutritional requirements of poultry which is between 5 and 10 days of hatching.

7. The process of claim 1 wherein the high moisture solid contains between about 50% and about 75% by weight water and between about 25% and about 50% by weight dry matter with the carbohydrate comprising at least about 50% by weight of the dry matter.

8. The process of claim 7 wherein:

the carbohydrate is selected from the group consisting of corn starch, wheat starch, modified corn starch, a gum, whole, ground, cracked, milled, rolled, extruded, pelleted, defatted, dehydrated, solvent extracted, or other processed form of corn or wheat, and mixtures thereof; and the amino acid source is selected from the group consisting of methionine, tryptophan, threonine, arginine, lysine, 2-hydroxy-4-(methylthio)butanoic acid, a salt of 2-hydroxy-4-(methylthio)butanoic acid, serum proteins, casein, soybean meal, fishmeal, meat meal, egg white, egg yolk, eggs without shells, and mixtures thereof.

9. The process of claim 8, wherein the gum is algin.

10. The process of claim 1 wherein the high moisture solid additionally contains fat, a vitamin, a mineral, an enzyme, an enzyme co-factor, a peptide, a hormone, a prostaglandin, an antibiotic, a natural or synthetic antioxidant, yeast, bacteria, a palatability modifier, a digestion aid, an immunoactive agent, or a growth promoter.

11. The process of claim 1 wherein the high moisture solid comprises at least about $10^2$ colony forming units of bacteria or at least about 10 colony forming units of yeast per gram of high moisture solid.

12. The process of claim 1 wherein the high moisture solid comprises at least about $10^2$ colony forming units of a lactic acid bacterium per gram of high moisture solid.

13. The process of claim 1 wherein the high moisture solid comprises at least about $10^4$ colony forming units of a microorganism of the genus Lactobacillus per gram of high moisture solid.

14. The process of claim 1 wherein the high moisture solid comprises at least about $10^2$ colony forming units of a microorganism of the genus Bacillus per gram of high moisture solid.

15. The process of claim 1 wherein the high moisture solid is made available to the poultry by placing the high moisture solid along with the poultry in a shipping container.

16. A process for enhancing the health, livability, cumulative weight gain, or feed conversion efficiency of poultry, the process comprising making available for consumption ad libitum a high moisture solid to the poultry before the poultry eats dry food, the high moisture solid containing between about 30% and 90% by weight water and between about 10% and about 70% dry matter based upon the weight of the high moisture solid, wherein the dry matter contains a nutritive carbohydrate and an amino acid source selected from the group consisting of proteins, complex protein sources, amino acids, precursors of amino acids, and analogs of amino acids, and wherein the nutritive carbohydrate constitutes at least about 10% by weight of the dry matter.

17. The process of claim 16 further comprising hatching the poultry in one location and shipping the hatchlings to a remote location to be grown, wherein the high moisture solid is made available to the poultry after the poultry has been shipped to the remote location.

18. The process of claim 16 wherein the high moisture solid is made available to the poultry by placing the high moisture solid in an incubator along with the eggs from which the poultry will hatch thereby making the high moisture solid available to the poultry upon hatching.

19. The process of claim 16 wherein the high moisture solid contains at least about 50% to 75% by weight water and about 25% to about 50% by weight dry matter, the dry matter comprising between about 15% and about 50% by weight proteins, complex protein sources amino acids, or precursors or analogues of amino acids, about 50% to about 70% by weight carbohydrate, and between about 0% and about 5% by weight fat.

20. The process of claim 19 wherein:
the carbohydrate is selected from the group consisting of corn starch, wheat starch, modified corn starch, a gum, whole, ground, cracked, milled, rolled, extruded, pelleted, defatted, dehydrated, solvent extracted, or other processed form of corn or wheat, and mixtures thereof; and the proteins, complex protein sources, amino acids, or precursors or analogues of amino acids are selected from the group consisting of methionine, tryptophan, threonine, arginine, lysine, 2-hydroxy-4-(methylthio) butanoic acid, a salt of 2-hydroxy-4-(methylthio) butanoic acid, serum proteins, casein, soybean meal, fishmeal, meat meal, egg white, egg yolk, eggs without shells, and mixtures thereof.

21. The process of claim 20, wherein the gum is algin.

22. The process of claim 16, wherein the high moisture solid is made available to the poultry by placing the high moisture solid along with the poultry in a shipping container.

23. A process for enhancing the health, livability, cumulative weight gain, or feed conversion efficiency of poultry hatchlings, the process comprising making available to the hatchlings within 5 days after hatching a high moisture solid for consumption ad libitum before the poultry is allowed to eat dry food, the high moisture solid containing between about 50% and 85% by weight water and between about 15% and about 50% by weight dry matter based upon the weight of the high moisture solid, wherein the dry matter contains a carbohydrate and an amino acid source selected from the group consisting of proteins, complex protein sources, amino acids, precursors of amino acids, and analogs of amino acids, wherein the carbohydrate constitutes at least about 10% by weight of the dry matter.

24. The process of claim 23 wherein the high moisture solid is made available to the hatchlings within the first 3 days after hatching.

25. The process of claim 23 wherein the high moisture solid is made available to the hatchlings within the first 2 days after hatching.

26. The process of claim 23 wherein the high moisture solid contains between about 50% and about 75% by weight water and between about 25% and about 50% by weight dry matter with the carbohydrate comprising at least about 50% by weight of the dry matter.

27. The process of claim 26 wherein:
the carbohydrate is selected from the group consisting of corn starch, wheat starch, modified corn starch, a gum, whole, ground, cracked, milled, rolled, extruded, pelleted, defatted, dehydrated, solvent extracted, or other processed form of corn or wheat, and mixtures thereof; and the amino acid source is selected from the group consisting of methionine, tryptophan, threonine, arginine, lysine, 2-hydroxy-4-(methylthio)butanoic acid, a salt of 2-hydroxy-4-(methylthio)butanoic acid, serum proteins, casein, soybean meal, fishmeal, meat meal, egg white, egg yolk, eggs without shells, and mixtures thereof.

28. The process of claim 27 wherein the gum is algin.

29. The process of claim 23 wherein the high moisture solid additionally contains fat, a vitamin, a mineral, an enzyme, an enzyme co-factor, a peptide, a hormone, a prostaglandin, an antibiotic, an antioxidant, yeast, bacteria, a palatability modifier, a digestion aid, an immunoactive agent, or a growth promoter.

30. The process of claim 23 wherein the high moisture solid comprises at least about $10^2$ colony forming units of bacteria or at least about 10 colony forming units of yeast per gram of high moisture solid.

31. The process of claim 23, wherein the high moisture solid comprises at least about $10^2$ colony forming units of a lactic acid bacterium per gram of high moisture solid.

32. The process of claim 23, wherein the high moisture solid lacks the complete nutritional requirements of such newly hatched poultry which is between 5 and 10 days after hatch.

33. The process of claim 23, wherein the high moisture solid is made available to the poultry by placing the high moisture solid along with the poultry in a shipping container.

34. A process for inoculating poultry with yeast or bacteria, the process comprising making available for consumption ad libitum a high moisture solid to the poultry before the poultry is fed dry food, the high moisture solid containing:

between about 30% and about 90% by weight water, and between about 10% and about 70% by weight dry matter based upon the weight of the high moisture solid, wherein the dry matter contains at least about 10% by weight carbohydrate and between about 15% and about 50% by weight of an amino acid source, and at least 10 colony forming units of the yeast or $10^2$ colony forming units of the bacteria per gram of the high moisture solid.

35. The process of claim 34 wherein the high moisture solid contains at least about $10^4$ colony forming units of a lactic acid bacterium per gram of high moisture solid.

36. The process of claim 34 wherein the high moisture solid comprises at least about $10^4$ colony forming units of a microorganism of the genus Lactobacillus per gram of high moisture solid.

37. The process of claim 34 wherein the high moisture solid comprises at least about $10^4$ colony forming units of a microorganism of the genus Bacillus per gram of high moisture solid.

38. The process of claim 34 wherein:

the carbohydrate is selected from the group consisting of corn starch, wheat starch, modified corn starch, a gum, whole, ground, cracked, milled, rolled, extruded, pelleted, defatted, dehydrated, solvent extracted, or other processed form of corn or wheat, and mixtures thereof; and the amino acid source is selected from the group consisting of methionine, tryptophan, threonine, arginine, lysine, 2-hydroxy-4-(methylthio)butanoic acid, a salt of 2-hydroxy-4-(methlthio)butanoic acid, serum proteins, casein, soybean meal, fishmeal, meat meal, egg white, egg yolk, eggs without shells, and mixtures thereof.

39. The process of claim 38 wherein the gum is algin.

40. The process of claim 34 wherein the high moisture solid is made available to the poultry by placing the high moisture solid along with the poultry in a shipping container.

41. A process for hatching poultry eggs, comprising:

(a) placing a set of poultry eggs in an incubator until the poultry hatches from the eggs, (b) placing the hatchlings in a container for shipment to a remote location, (c) shipping the hatchlings in the container to a remote location, and (d) making available for consumption ad libitum a high moisture solid to the hatchlings before they are shipped to the remote location and before they are allowed to eat dry food, the high moisture solid containing between about 30% and 90% by weight water and between about 10% and about 70% dry matter based upon the weight of the high moisture solid, wherein the dry matter contains at least about 10% by weight carbohydrate and between about 15% and about 50% by weight of an amino acid source based on the weight of the dry matter.

42. The process of claim 41 wherein the high moisture solid is made available to the hatchlings prior to placing the hatchlings in the shipping container.

43. The process of claim 41 wherein the hatchlings of step (d) are no more than 5 days old.

44. The process of claim 41 wherein:

the carbohydrate is selected from the group consisting of corn starch, wheat starch, modified corn starch, a gum, whole, ground, cracked, milled, rolled, extruded, pelleted, defatted, dehydrated, solvent extracted, or other processed form of corn or wheat, and mixtures thereof; and the amino acid source is selected from the group consisting of methionine, tryptophan, threonine, arginine, lysine, 2-hydroxy-4-(methylthio)butanoic acid, a salt of 2-hydroxy-4-(methylthio)butanoic acid, serum proteins, casein, soybean meal, fishmeal, meat meal, egg white, egg yolk, eggs without shells, and mixtures thereof.

45. The process of claim 44 wherein the gum is algin.

46. The process of claim 41 wherein the high moisture solid is made available to the poultry by placing the high moisture solid along with the poultry in a shipping container.

47. A process for enhancing the health, livability, cumulative weight gain, or feed conversion efficiency of poultry, the process comprising making available for consumption ad libitum to the poultry before the poultry is allowed to eat dry food ad libitum a high moisture solid containing:

between about 50% and about 95% by weight water and between about 5% and about 50% by weight dry matter, based on the weight of the high moisture solid, wherein the dry matter contains between about 10% and about 90% by weight carbohydrate, up to about 70% by weight amino acids, precursors or analogues of amino acids, complex protein sources, or proteins, and up to about 15% by weight fat, based on the weight of the dry matter.

48. The process of claim 47, wherein the high moisture solid contains:

between about 50% and about 95% by weight water and between about 15% and about 50% by weight dry matter, based on the weight of the high moisture solid, wherein the dry matter contains between about 50% and about 70% by weight carbohydrate, about 15% to about 50% by weight amino acids, precursors or analogues of amino acids, complex protein sources or proteins, and about 0% to about 10% by weight fat, based on the weight of the dry matter.

49. The process of claim 47, wherein the high moisture solid contains:

between about 65% and about 75% by weight water and between about 25% and about 35% by weight dry matter, based on the weight of the high moisture solid, wherein the dry matter contains about 60% by weight carbohydrate, between about 15% to about 50% by weight amino acids, precursors or analogues of amino acids, complex protein sources or proteins, and about 0% to about 5% by weight fat, based on the weight of the dry matter.

50. The process of claim 49 wherein:

the carbohydrate is selected from the group consisting of corn starch, wheat starch, modified corn starch, a gum, whole, ground, cracked, milled, rolled, extruded, pelleted, defatted, dehydrated, solvent extracted, or other processed form of corn or wheat, and mixtures thereof; and the amino acids, precursors or analogues of amino acids, complex protein sources, or proteins are selected from the group consisting of methionine, tryptophan, threonine, arginine, lysine, 2-hydroxy-4-(methylthio)

butanoic acid, a salt of 2-hydroxy-4-(methylthio) butanoic acid, serum proteins, casein, soybean meal, fishmeal, meat meal, egg white, egg yolk, eggs without shells, and mixtures thereof.

51. The process of claim 50 wherein the gum is algin.

52. The process of claim 47, wherein the high moisture solid contains:
   between about 65% and about 75% by weight water and between about 25% and about 35% by weight dry matter, based on the weight of the high moisture solid,
   wherein the dry matter contains about 60% by weight carbohydrate, about 35% by weight protein or complex protein source, and about 5% by weight fat, based on the weight of the dry matter.

53. The process of claim 47, wherein the high moisture solid additionally contains a component selected from the group consisting of a vitamin, a mineral, a receptor, a transfer factor, a chelator, a complexing agent, a palatability modifier, a digestion aid, a steroid, an immunoactive agent, a direct fed microbial, an enzyme co-factor, a peptide, a hormone, a prostaglandin, an antibiotic, a natural or synthetic antioxidant, and a growth promoter.

54. The process of claim 47 wherein the poultry are within 5 days after hatching.

55. The process of claim 47 wherein the poultry are within 3 days after hatching.

56. The process of claim 47 wherein the poultry are within 2 days after hatching.

57. The process of claim 47 wherein the high moisture solid is made available to the poultry by placing the high moisture solid along with the poultry in a shipping container.

58. A process for hatching poultry eggs comprising:
   (a) placing a set of poultry eggs in an incubator until the poultry hatches from the eggs,
   (b) placing the hatchlings in a container for shipment to a remote location,
   (c) shipping the hatchlings in the container to a remote location, and
   (d) making available for consumption ad libitum to the hatchlings before they are shipped to the remote location and before they are fed dry food a high moisture solid containing:
   between about 50% and about 95% by weight water and
   between about 5% and about 50% by weight dry matter, based on the weight of the high moisture solid,
   wherein the dry matter contains between about 10% and about 90% by weight carbohydrate, up to about 70% by weight amino acids, precursors or analogues of amino acids, complex protein sources, or proteins, and up to about 15% by weight fat, based on the weight of the dry matter.

59. The process of claim 58 wherein the high moisture solid additionally contains a component selected from the group consisting of a vitamin, a mineral, an enzyme co-factor, a peptide, a hormone, a prostaglandin, an antibiotic, a natural or synthetic antioxidant, a bacterium, a yeast, a palatability modifier, a digestion aid, an immunoactive agent, and a growth promoter.

60. The process of claim 58 wherein the hatchlings are fed the high moisture solid prior to being placed in the shipping container.

61. The process of claim 58 wherein the hatchlings of step (d) are no more than 5 days old.

62. The process of claim 58 wherein:
   the carbohydrate is selected from the group consisting of corn starch, wheat starch, modified corn starch, a gum, whole, ground, cracked, milled, rolled, extruded, pelleted, defatted, dehydrated, solvent extracted, or other processed form of corn or wheat, and mixtures thereof; and
   the amino acids, precursors or analogues of amino acids, complex protein sources, or proteins are selected from the group consisting of methionine, tryptophan, threonine, arginine, lysine, 2-hydroxy-4-(methylthio) butanoic acid, a salt of 2-hydroxy-4-(methylthio) butanoic acid, serum proteins, casein, soybean meal, fishmeal, meat meal, egg white, egg yolk, eggs without shells, and mixtures thereof.

63. The process of claim 62 wherein the gum is algin.

64. The process of claim 58 wherein the high moisture solid is made available to the poultry by placing the high moisture solid along with the poultry in a shipping container.

* * * * *